United States Patent
Gyoten

[11] Patent Number: 6,011,365
[45] Date of Patent: Jan. 4, 2000

[54] ELECTROMAGNETIC FOCUS APPARATUS

[75] Inventor: Takaaki Gyoten, Koube, Japan

[73] Assignee: Matsushita Electric Industrial Co., Ltd., Osaka, Japan

[21] Appl. No.: 09/003,811

[22] Filed: Jan. 7, 1998

[30] Foreign Application Priority Data

Jan. 14, 1997 [JP] Japan .................................. 9-017484
May 30, 1997 [JP] Japan .................................. 9-158124

[51] Int. Cl.[7] .................................................. H01J 29/58
[52] U.S. Cl. .................... 315/382; 315/382.1; 315/371
[58] Field of Search .................................. 315/371, 382, 315/382.1, 411

[56] References Cited

U.S. PATENT DOCUMENTS

| | | |
|---|---|---|
| 3,911,295 | 10/1975 | Barkow . |
| 4,499,457 | 2/1985 | Hintze . |
| 4,587,464 | 5/1986 | Ho et al. .................................. 315/382 |
| 5,381,179 | 1/1995 | Perreaut et al. .......................... 315/382 |
| 5,382,888 | 1/1995 | Perreaut et al. .......................... 315/382 |
| 5,512,804 | 4/1996 | Yamamoto ............................ 315/382.1 |
| 5,747,949 | 5/1998 | Gyoten et al. ......................... 315/382.1 |

FOREIGN PATENT DOCUMENTS 8256277  10/1996  Japan .

*Primary Examiner*—Edward P. Westin
*Assistant Examiner*—Nokita Wells
*Attorney, Agent, or Firm*—Greenblum & Bernstein, P.L.C.

[57] ABSTRACT

The focus coil 14 adjusts the focal point of electron beam which forms raster. The electromagnetic focus apparatus controls the ON/OFF-combinations of the respective switches 42 to 45 in synchronization with the horizontal synchronization signal S1. By this ON/OFF-controlling, the current waveform is formed, which is supplied into the focus coil 14. The microcomputer 55 adjusts the timing of the ON/OFF-controlling of the respective switches 42 to 45 in compliance with the horizontal amplitude value of the electron beam.

11 Claims, 17 Drawing Sheets

RASTER FORMATION
AND CURRENT AMPLIFICATION
IN A CASE OF RIGHT ANGLE PROJECTION

RASTER FORMATION
AND CURRENT AMPLIFICATION
IN A CASE OF DIAGONAL PROJECTION

ELECTROMAGNETIC FOCUS APPARATUS

BACKGROUND OF THE INVENTION

1. Field of the Invention

The present invention relates to an electromagnetic focus circuit, used for a cathode-ray tube, which generates electric current waveform of electric current to be supplied to a focus coil by ON/OFF-controlling of a plurality of switches.

2. Description of the Related Art

FIG. 1 is a configurational view of a conventional electromagnetic focus circuit. The electromagnetic focus circuit 100 connects the first and second voltage-variable power sources 101, 102 and a focus coil 103, through which electron beams forming raster pass, to each other. The electromagnetic focus circuit 100 generates electric current waveform synchronized with horizontal synchronization signals by ON/OFF-controlling of four switches 104 to 107.

A microcomputer 108 establishes predetermined ON/OFF-timings of the switches 104 to 107 on the basis of a synchronization pulse when detecting the synchronization pulse of the horizontal synchronization signal S1. Pulses are issued to the corresponding switches 104 to 107 from four pulse generation circuits 110 to 113 in compliance with the established timings. The respective switches 104 to 107 are controlled in response to the pulses supplied thereto.

As the switches 105, 106 are simultaneously turned on, the second voltage-variable power source 102 and focus coil 103 are connected to each other. Electric current which linearly increases in proportion to time is caused to flow from the second voltage-variable power source 102 to the focus coil 103. Furthermore, as the switches 104, 106 are simultaneously turned on, the first and second voltage-variable power sources 101, 102 and focus coil 103 are connected to each other. Electric current which linearly increases in proportion to time is caused to flow from the first and second voltage-variable power sources 101, 102 connected in series to each other to the focus coil 103. At this time, the ratio of an increase of electric current is proportionate to the voltage of the power sources.

A counter electromotive force is produced in the focus coil 103 when the switch 104 is turned off, and a diode 115 is turned on by the counter electromotive force. The focus coil 103 is short-circuited by the diode 15 and switch 106, whereby a constant current is caused to continuously flow into the focus coil 103. Subsequently, if the switch 106 is turned off, a counter electromotive force generated at the focus coil 103 turns on a diode 116. Electric current is caused to reversely flow from the first and second voltage-variable power sources 101, 102 connected in series to each other, to the focus coil 103. The electric current is decreased in inverse proportion to time. Continuously, as the switch 107 is turned on, the second voltage-variable power source 102 and focus coil 103 are inversely connected to each other, wherein the electric current flowing in the focus coil 103 is decreased in inverse proportion to time. At this time, the ratio of a decrease of the electric current is proportionate to the power source voltage. At the moment when no electric current flows into the focus coil 103, the counter electromotive force of the focus coil 103 becomes zero. As a result, the diode 115 is turned off. Since the power supplied from the first and second voltage-variable power sources 101, 102 is regenerated, the mean value of the power supplied from two voltage-variable power sources 101, 102 becomes very small.

While horizontal scanning is carried out by an electron beam, it is preferable in order to continuously cause the focus of the electron beam to the fluorescent surface that the ideal electric current waveform is supplied to the focus coil. The conventional electromagnetic focus circuit supplies to the focus coil an electric current waveform which is as proximate to the ideal electric current waveform as possible, through an ON/OFF-controlling of the switches.

However, since the abovementioned conventional electromagnetic focus circuit has no function to limit the electric current in the circuit, there is such a shortcoming that overcurrent flows into the focus coil 103 if the voltage of the first and second voltage-variable power sources 101, 102 is too high with respect to the cycle of the horizontal synchronization signal S1.

Furthermore, if the switches 105 and 106 or the switches 106 and 107 are simultaneously turned on, there is such a problem that the voltage-variable power sources 101, 102 are short-circuited.

Furthermore, in a case where an effective picture term in the horizontal direction changes, strains may be produced in the approximate current waveform, and the amplitude of the electric current waveform may change. Furthermore, in a case of diagonal projection, the focus current accuracy may change below and above the picture screen. Resultantly, such a problem arises, by which the difference between the ideal current waveform and the actual waveform becomes large, resulting in a lowering of the picture quality.

SUMMARY OF THE INVENTION

In view of the abovementioned situations, the invention was developed, and it is therefore the first object of the invention to provide an electromagnetic focus circuit which is able to securely prevent overcurrent from flowing into a focus coil.

With the invention, the above object can be achieved by turning off a switch installed in a line for supplying electric current to the focus coil when the value of electric current flowing into the focus coil exceeds a predetermined value.

Furthermore, it is the second object of the invention to provide an electromagnetic focus circuit which is able to securely prevent the power source of the focus circuit from being short-circuited.

With the invention, the abovementioned object is achieved by controlling a switch which has a possibility for the power source of the focus coil to be short-circuited if the switch is simultaneously turned on, so that one switch is not turned on while the other switch is turned on.

Furthermore, it is third object of the invention to provide an electromagnetic focus circuit which does not decrease the approximate accuracy of the electric current waveform of the focus coil with respect to the ideal electric current waveform, even in a case where the effective picture term in the horizontal direction changes or where the projection is diagonal.

With the invention, the abovementioned object is achieved by adjusting the switching timing of a plurality of switches in compliance with the horizontal amplitude value and adjusting the output voltage of the power source in response to the horizontal amplitude value.

DESCRIPTION OF THE PREFERRED EMBODIMENTS

Hereinafter, a description is given of preferred embodiments of the invention with reference to the accompanying drawings.

(Embodiment 1)

Figure 1:
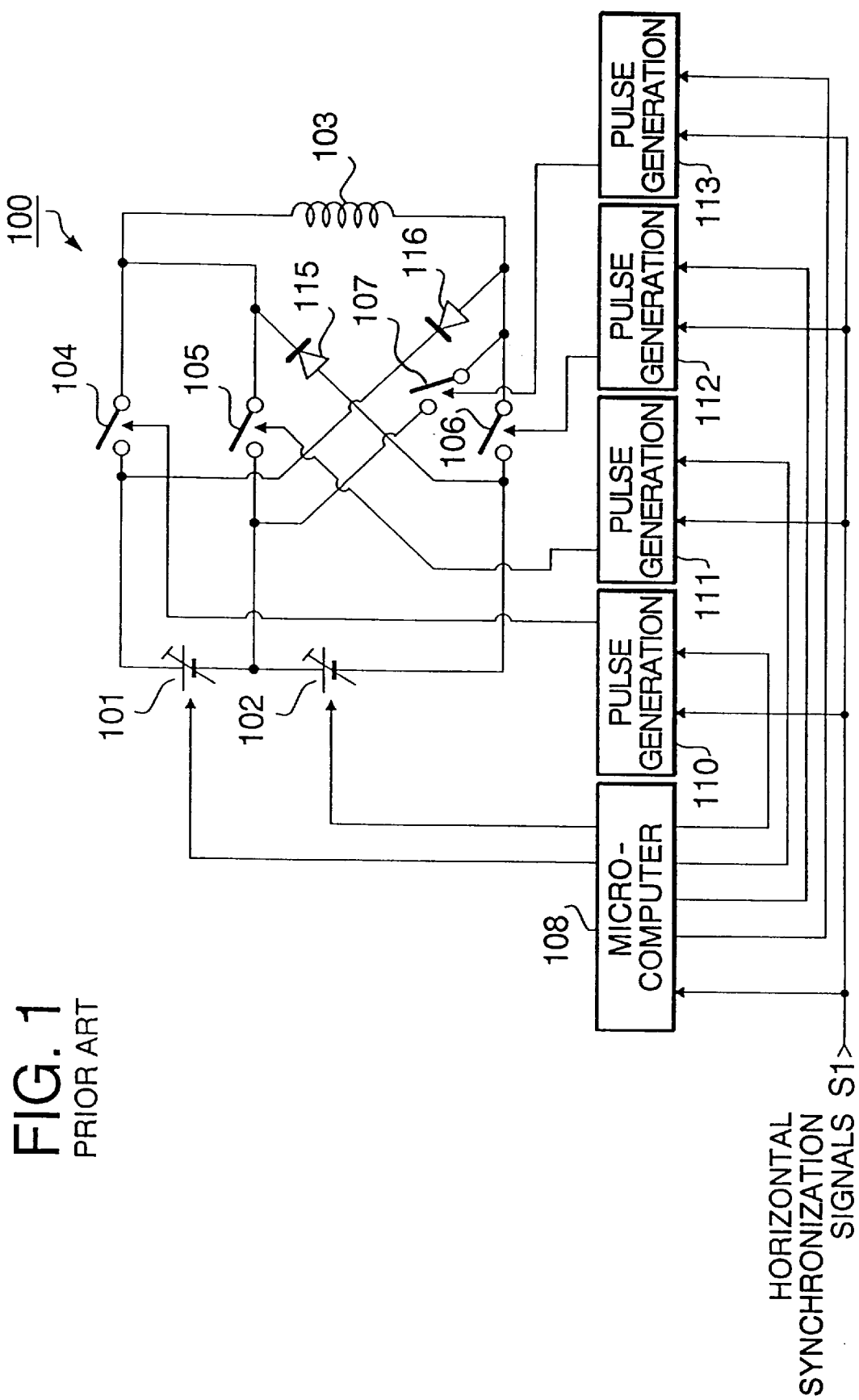
FIG. 1 is a configurational view of a conventional electromagnetic focus circuit.
Figure 2:
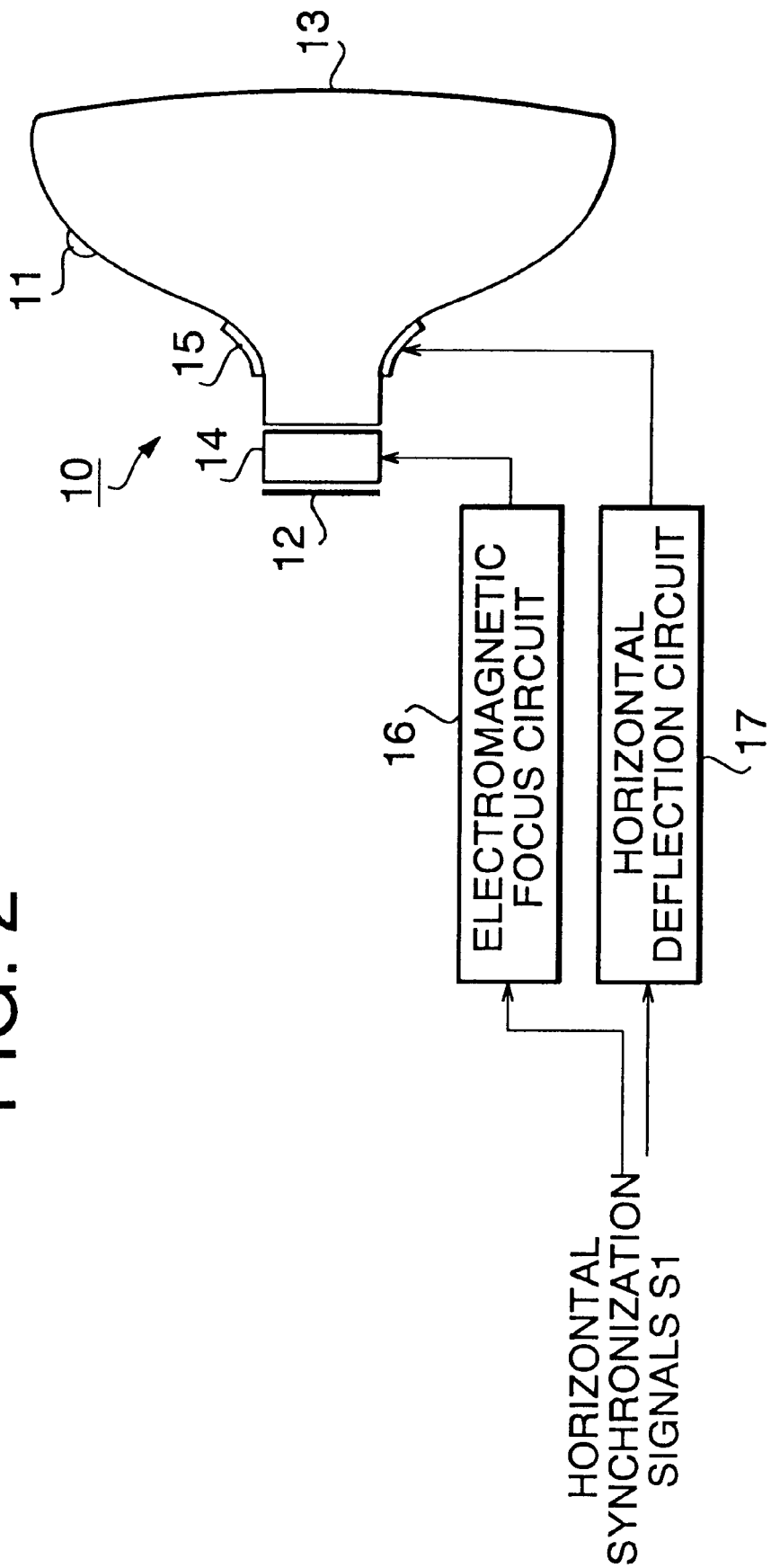
FIG. 2 is a rough configurational view of a cathode-ray tube.

FIG. 2 is a rough configurational view of a cathode-ray tube 10 to which an electromagnetic focus circuit according to the invention is applied.

The cathode-ray tube 10 is equipped with an anode 11, a cathode 12 which emits electron beams and a fluorescent surface 13 which emits light by collision of electron beams and forms picture screen. The focus of electron beams emitted from the cathode 12 is adjusted by actions of the focus coil 14, and horizontal scanning is carried out by the electron beam, the focus of which is adjusted, in synchronization with horizontal synchronization signals by actions of a deflection yoke 15. Resultantly, raster is formed on the fluorescent surface 13 by the electron beam. The actions of the focus coil 14 are controlled by the electromagnetic focus circuit 16 while the actions of the deflection yoke 15 are controlled by a horizontal deflection circuit 17.

Figure 3:
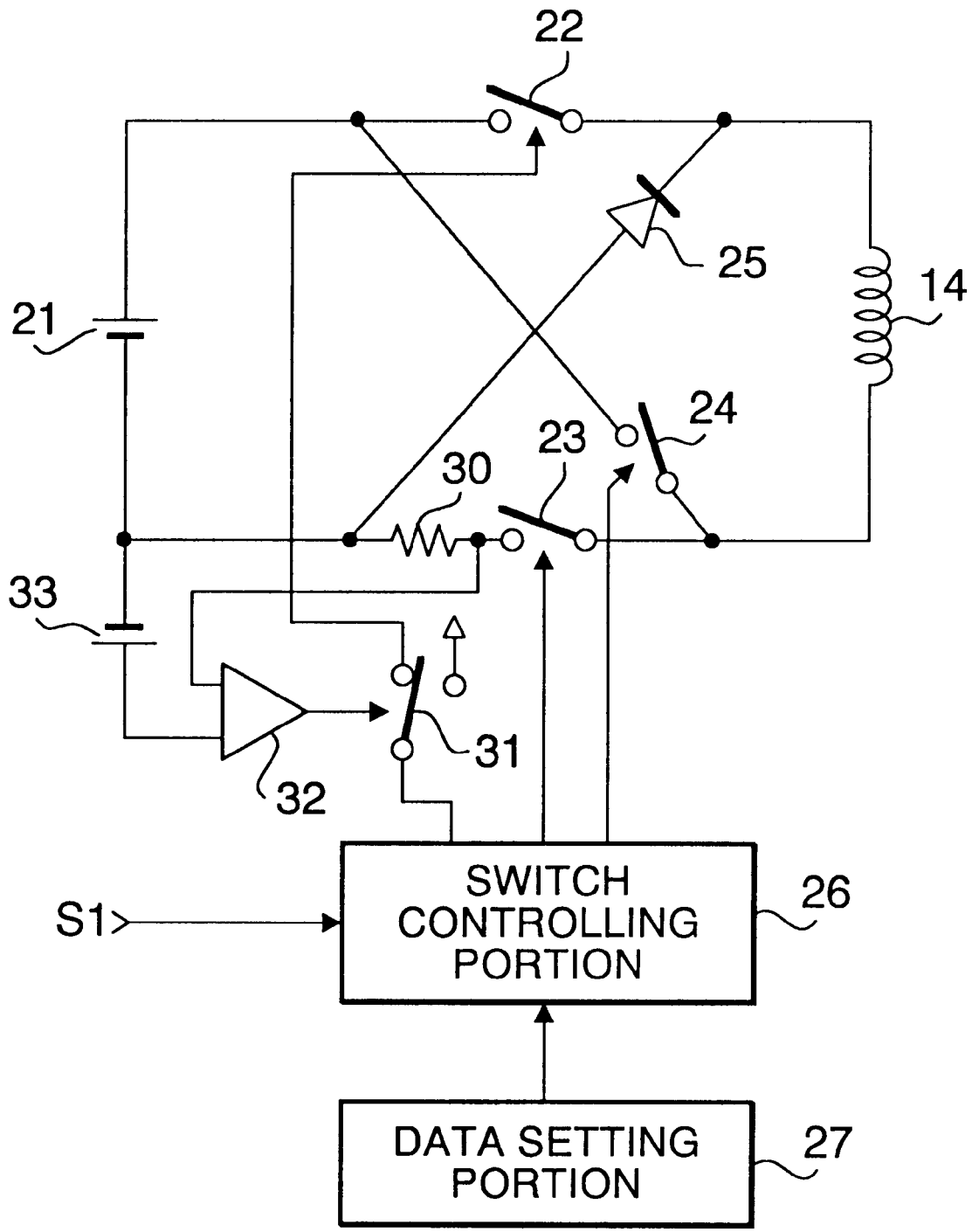
FIG. 3 is a configurational view of an electromagnetic focus circuit according to a first preferred embodiment.

FIG. 3 is a configurational view of an electromagnetic focus circuit in the first preferred embodiment.

The electromagnetic focus circuit shown in FIG. 3 is such that a switch 22, a focus coil 14 and another switch 23 are connected to each other in series between both ends of a voltage-variable power source 21. An intermediate point between the voltage-variable power source 21 is connected via a switch 24 to an intermediate point between the focus coil 14 and the switch 23, and a diode 25 is inversely connected between any intermediate point between the switch 22 and the focus coil 14 and an intermediate point between the cathode of the voltage-variable power source 21 and the switch 23. The switches 22,23 and 24 are controlled by a switch controlling portion 26, and the ON/OFF-timings are established for the switch controlling portion 26 from a data setting portion 27.

A current detection resistor 30 is caused to intervene between the cathode of the voltage-variable power source 21 and the switch 23 and an always closed switch 31 which forcibly turns off the switch 22 is employed in the line for controlling the switch 22 from the switch controlling portion 26. The switch 22 is set so that the same is forcibly turned off in synchronization with opening of the always-closed switch 31. The always-closed switch 31 is controlled by the output of a comparator 32. An anode of the reference power source 33 which generates a reference voltage to detect generation of overcurrent is connected to one comparison input terminal of a comparator 32 while a terminal to which the switch 23 of the current detecting resistor 30 is connected is connected to the other comparison input terminal. The comparator 32 compares the voltages of these comparison input terminals, and controls to open the always-closed switch 31 when the voltage of the terminal to which the current detecting resistor 30 is connected exceeds the reference voltage of the reference power source 33.

A description is given of actions of the electromagnetic focus circuit constructed as described above, with reference to FIG. 4.

Figure 4:
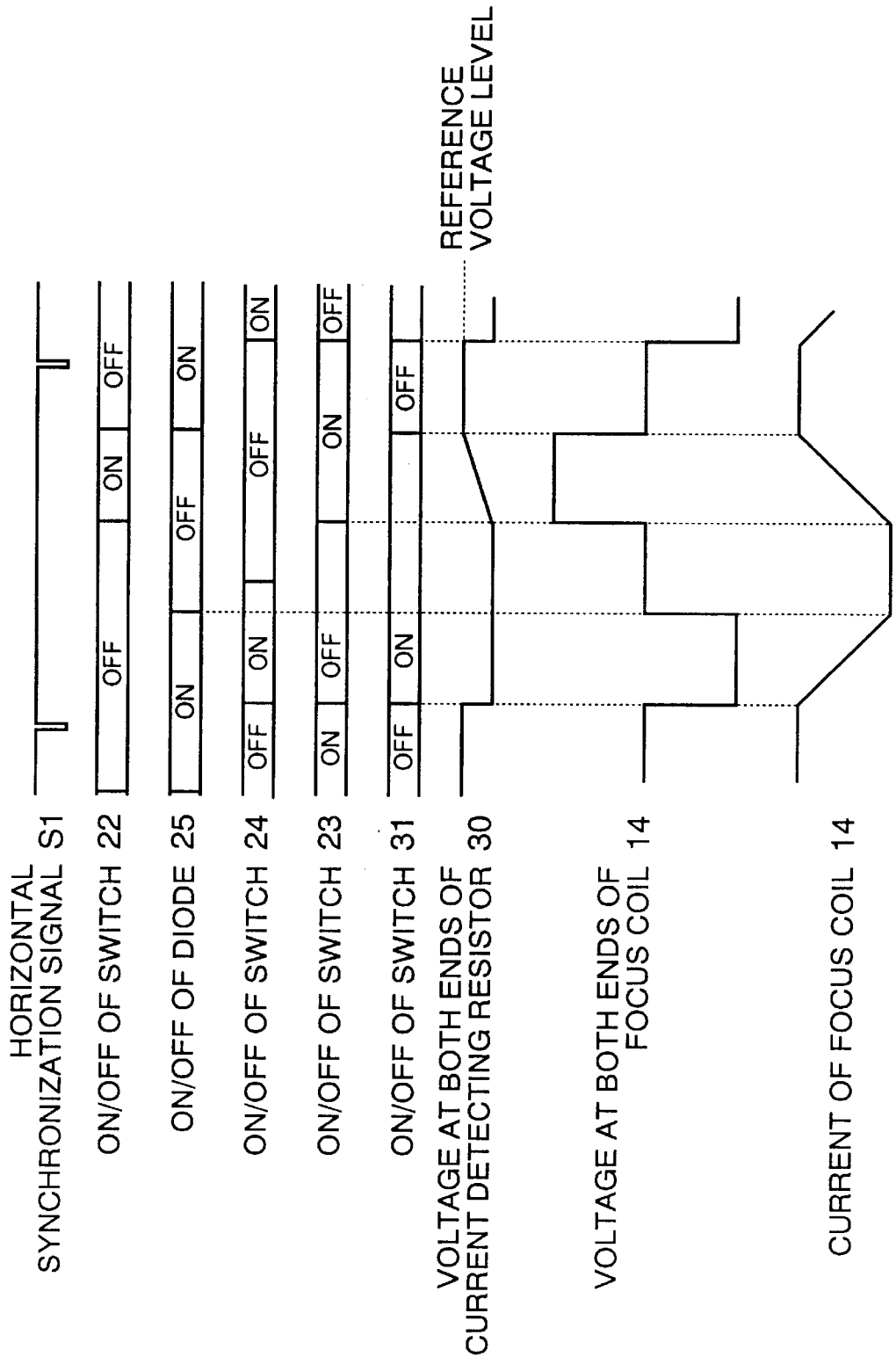
FIG. 4 is a view showing waveform at each part of the electromagnetic focus circuit in the first preferred embodiment.

The switch controlling portion 26 controls the ON/OFF-timings of the switches 22, 23, and 24 shown in FIG. 4, on the basis of horizontal synchronization signals in compliance with the timing established by the data setting portion 27. That is, the voltage-variable power source 21 and focus coil 14 are connected to each other at the timing when the switches 22 and 23 are simultaneously turned on, and the electric current is linearly increased in proportion to time.

Next, the diode 25 is turned on by a counter electromotive force of the focus coil 14 at the moment when the switch 22 is turned off, thereby causing the focus coil 14 to be short-circuited by the diode 25 and switch 23, whereby a constant current is continuously caused to flow into the focus coil 14.

Next, as the switch 24 is turned on while the switch 23 is turned off, the focus coil 14 is connected to the voltage-variable power source 21 by the diode 25 and switch 24, and the current value is decreased in inverse proportion to time. The counter electromotive force becomes zero at the moment when no current is permitted to flow to the focus coil 14, thereby causing the diode 24 to be turned off.

The current flowing into the focus coil 14 is detected by the current detecting resistor 30. The detection result and reference voltage of the reference power source 33 are compared by the comparator 32. And when the output of the current detecting resistor 30 becomes larger than the reference voltage, the always-closed switch 31 is opened to cause the switch 22 to be turned off.

Thus, by turning off the switch 22 secured in a line for supplying electric current to the focus coil 14 when the current flowing into the focus coil 14 is detected and the detected value exceeds the set value, overcurrent is prevented from flowing into the focus coil 14, and the current shown in FIG. 4 can be generated.

(Embodiment 2)

The second preferred embodiment is such that the reference voltage given to a comparator 32 which has a judgment feature with respect to whether or not the switch 22 is forcibly turned off is set to an adequate value in compliance with the cycle of horizontal synchronization signals.

Figure 5:
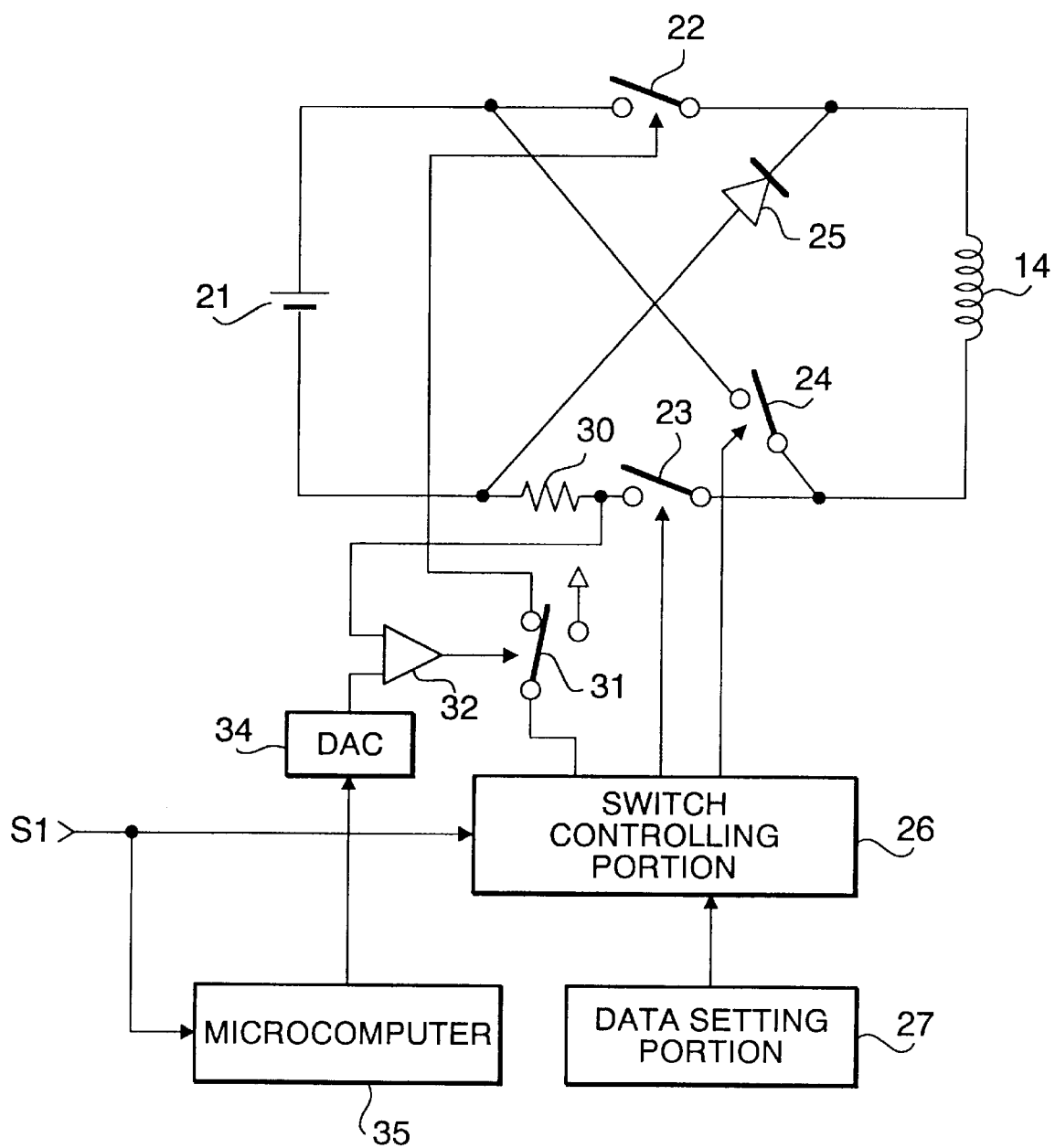
FIG. 5 is a configurational view of an electromagnetic focus circuit according to a second preferred embodiment.

FIG. 5 is a configurational view of an electromagnetic focus circuit according to the second preferred embodiment. Furthermore, parts which have the same functions as those of the electromagnetic focus circuit shown in FIG. 2 are given the same reference numbers.

In the comparator 32, a current detecting value of the current detecting resistor 30 is inputted into one comparison input terminal and a reference voltage value which a D/A converter outputs is inputted into the other comparison input terminal. A microcomputer 35 inputs horizontal synchronization signals to be inputted into the switch controlling portion 26 in parallel, measures the cycle of the horizontal synchronization signals and instructs the reference voltage value adapted to the cycle of measurement to the D/A converter 24.

A description is given of actions of the electromagnetic focus circuit constructed as described above, with reference to FIG. 6.

Figure 6:
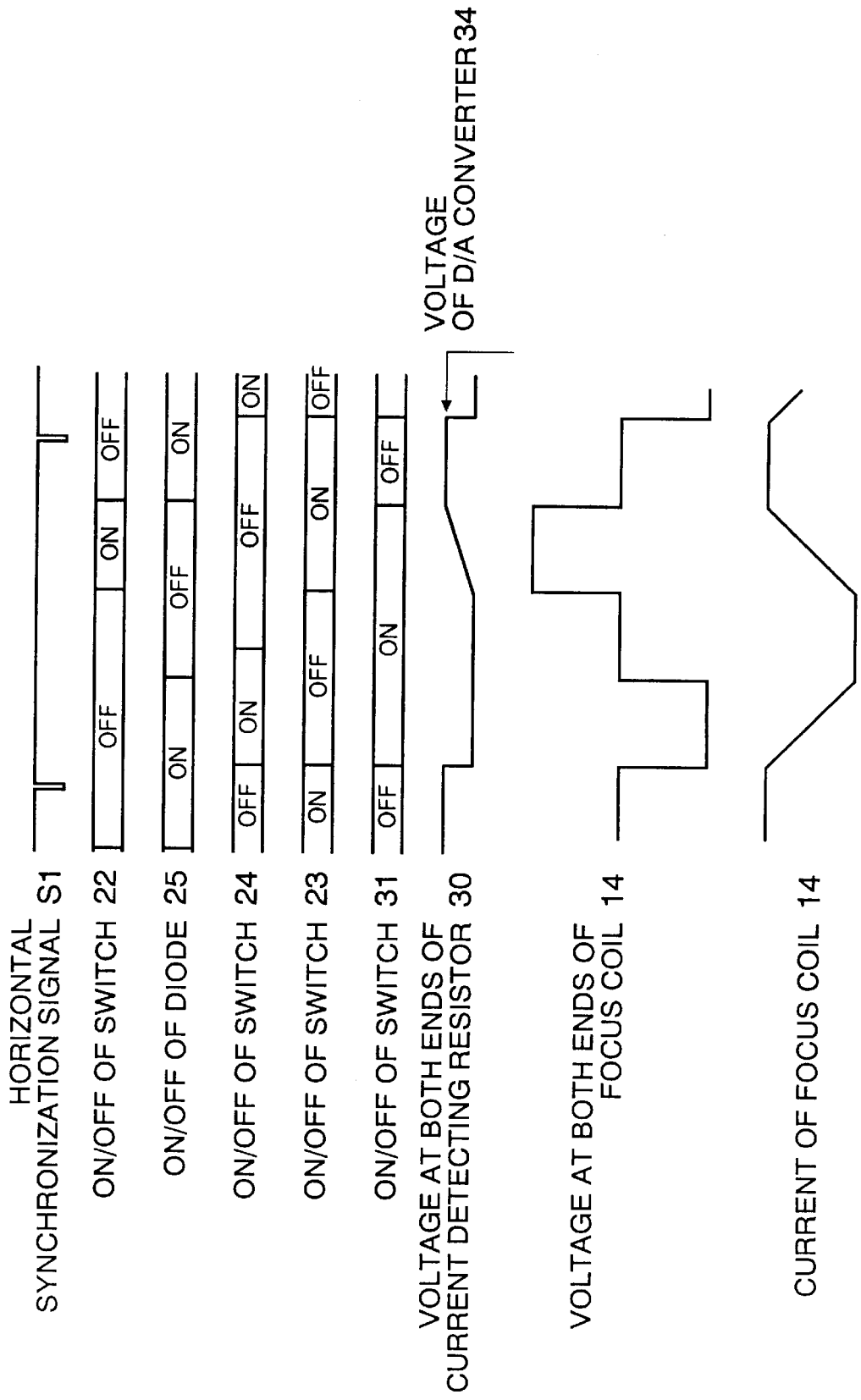
FIG. 6 is a view showing waveform at each part of the electromagnetic focus circuit in the second preferred embodiment.

The switch controlling portion 26 controls the ON/OFF-timings of the switches 22, 23, and 24, as shown in FIG. 6, in compliance with the timings established by the data setting portion 27 on the basis of horizontal synchronization signals.

Firstly, the voltage-variable power source 21 and focus coil 14 are connected to each other on the timing when the switches 22, 24 located in a line for supplying electric current to the focus coil 14 are simultaneously turned on, and the current of the focus coil 14 is linearly increase in proportion to time.

Next, the diode 25 is turned on by a counter electromotive force of the focus coil 14 at the moment when the switch 22 is turned off, whereby the focus coil 14 is short-circuited by the diode 25 and switch 23 whereby a constant current is caused to continuously flow.

Next, as the switch 23 is turned off and the switch 24 is turned on, the focus coil 14 is connected to the voltage-variable power source 21 by the diode 25 and switch 24, and the current is linearly decreased in inverse proportion to time. The counter electromotive force of the focus coil 14 becomes zero at the moment when no current is permitted to flow into the focus coil 14, whereby the diode 25 is turned off.

The electric current flowing into the focus coil 14 is detected by the current detection resistor 30, and the comparator 32 compares the detection result with the reference voltage of the D/A converter 34. In a case where the output of the current detecting resistor 30 becomes larger than the reference voltage, a switch 31 is opened to cause the switch 22 to be turned off.

Thus, the microcomputer 35 measures the cycle of horizontal synchronization signals, determine the reference voltage value adapted to the corresponding cycle, and dynamically establishes the reference voltage value by using the D/A converter 34. Therefore, it is possible to prevent overcurrent from flowing into the focus coil 14, not depending on the cycle of the horizontal synchronization signals.

(Embodiment 3)

The third preferred embodiment is such that the switches 23, 24 which have a possibility of short-circuiting the voltage-variable power source 21 if they are simultaneously turned on, while one switch is turned on the other switch is controlled so as not to be turned on.

Figure 7:
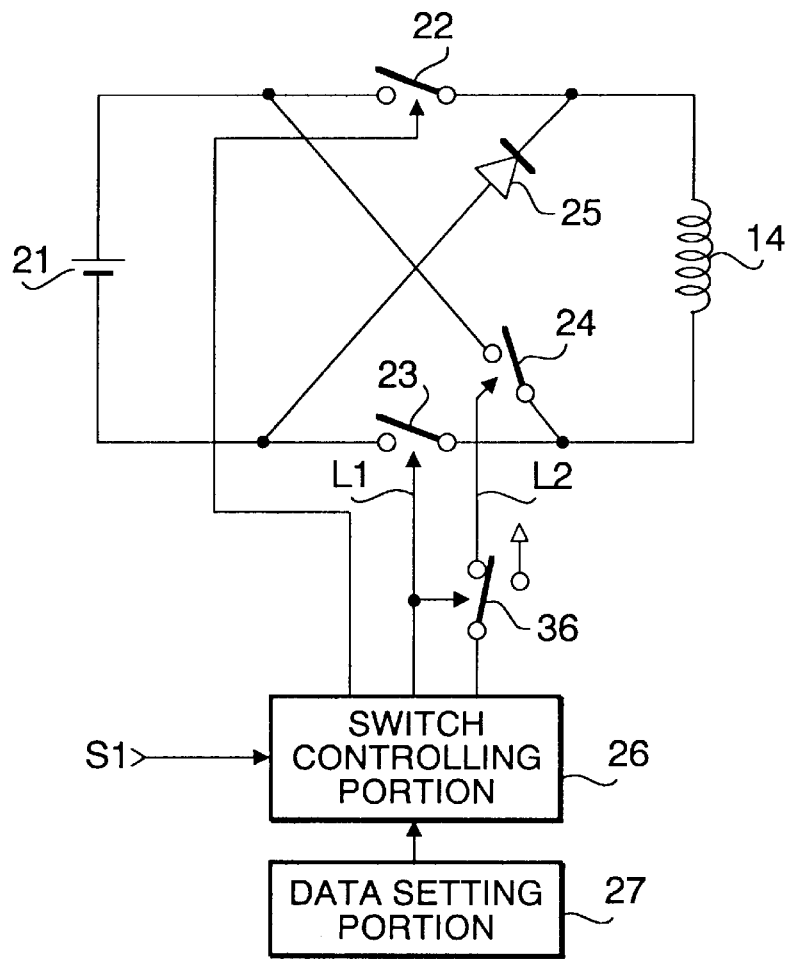
FIG. 7 is a configurational view of an electromagnetic focus circuit according to a third preferred embodiment.

FIG. 7 is a configurational view of an electromagnetic focus circuit according to the third preferred embodiment. Furthermore, parts which have the same functions as those of each part of the electromagnetic focus circuit shown in FIG. 3 are given the same reference numbers.

In the switch controlling portion 26, ON/OFF-control signals are given to the switches 23,24 via lines L1,L2. An always-closed switch 36 is incorporated in the line L2 which gives signals to the switch 24. The always-closed switch 36 is controlled in an inverse logic of the signal status of another line L1. Therefore, in a case where an ON control signal is outputted with respect to the switch 23, the switch 24 is forcibly turned off by opening the always-closed switch 36, and in a case where an OFF control signal is outputted with respect to the switch 23, the switch 24 is controlled by a signal outputted from the switch controlling portion 26 by closing the always-closed switch 36.

A description is given of actions of the electromagnetic focus circuit constructed as described above, with reference to FIG. 8.

Figure 8:
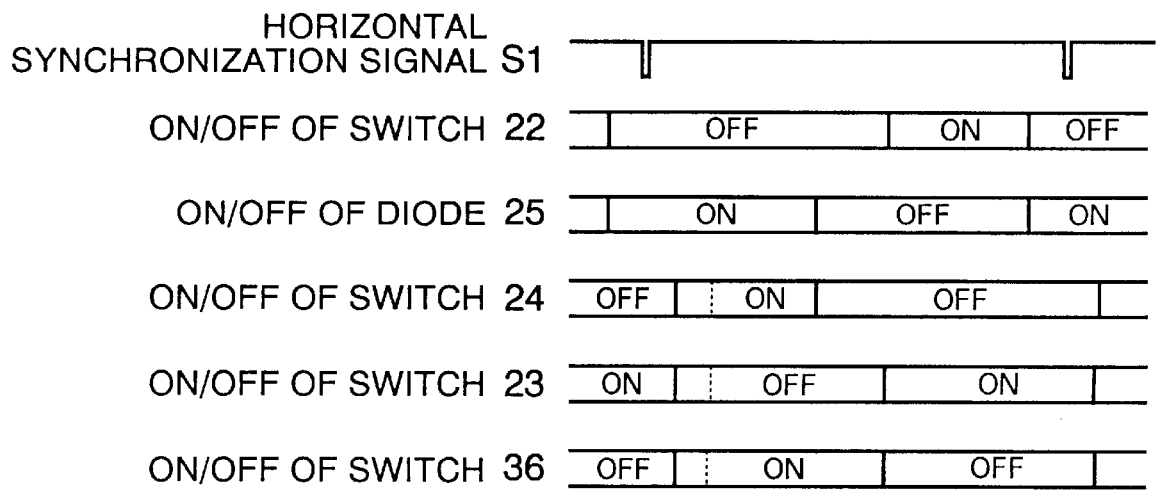
FIG. 8 is a view showing waveform at each part of the electromagnetic focus circuit in the third preferred embodiment.

The switch controlling portion 26 controls the ON/OFF-timings of the switches 22, 23, and 24, as shown in FIG. 8, in compliance with the timing established by the data setting portion 27 on the basis of horizontal synchronization signals. Signals for ON/OFF-controlling of the switch 24 are supplied through the always-closed switch 36 secured in the line L2, wherein the switch 24 can be turned off by controlling the corresponding switch 36. The voltage-variable power source 21 and focus coil 14 are connected to each other on the timing when the switches 22 and 23 are simultaneously turned on, and the current of the focus coil 14 is linearly increased in proportion to time.

Next, the diode 25 is turned on by a counter electromotive force of the focus coil 14 at the moment when the switch 22 is turned off, whereby the diode 25 and switch 23 are short-circuited by the focus coil 14 whereby a constant current is caused to continuously flow into the focus coil 14.

Next, as the switch 23 is turned off and the switch 24 is turned on, the focus coil 14 is connected to the voltage-variable power source 21 by the diode 25 and switch 24, and the current value of the focus coil 14 is decreased in inverse proportion to time. The counter electromotive force of the focus coil 14 becomes zero at the moment when no current is permitted to flow to the focus coil 14, thereby causing the diode 25 to be turned off.

Here, in the circuit shown in FIG. 7, the voltage-variable power source 21 is short-circuited if the switches 23 and 24 are simultaneously turned on. In order to exclude a state where the switches 23 and 24 are simultaneously turned on, the always-closed switch 36 which forcibly turns off the switch 24 are controlled by a control signal of another switch 23. In detail, as shown in FIG. 8, the always-closed switch 26 are controlled by an inverse logic of the switch 23.

Therefore, in a case where a control signal is issued so that the switches 24 and 23 are simultaneously turned on as shown with broken lines in FIG. 8, the switch 24 is forcibly turned off by actions of the always-closed switch 36 regardless of a control signal outputted by the switch controlling portion 27.

Thus, by controlling the switches so that, between signals which control the switch having a possibility for the power source of the focus coil to be short-circuited if the switch is simultaneously turned on, while one switch is turned on, the other switch is not turned on, it is possible to prevent the power source from being short-circuited.

(Embodiment 4)

The fourth preferred embodiment is such that the current waveform of the focus coil is partially corrected by slipping the ON/OFF-timing of the respective switches adaptive to the cycle of the horizontal synchronization signals.

Figure 9:
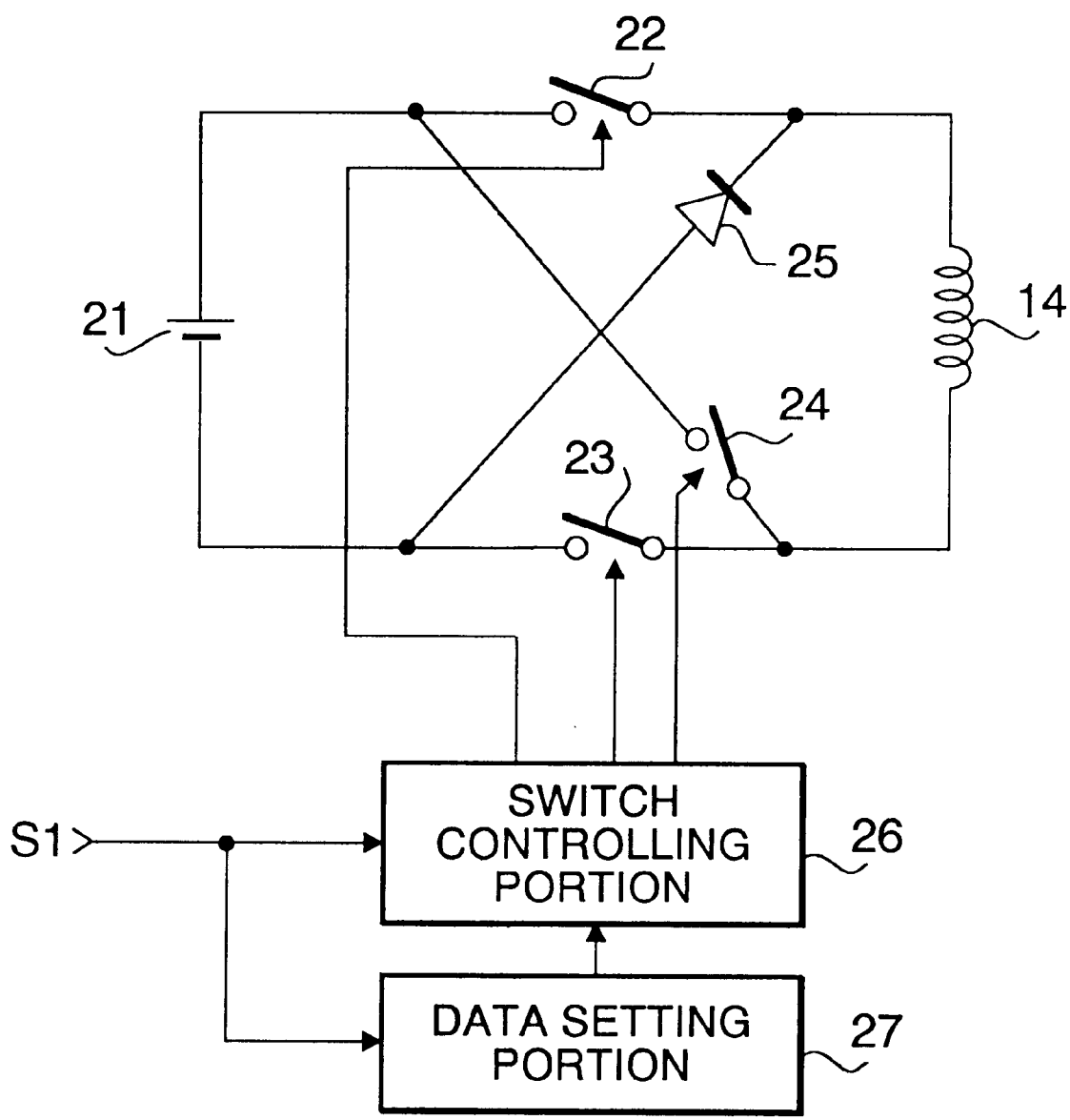
FIG. 9 is a configurational view of an electromagnetic focus circuit according to a fourth preferred embodiment.

FIG. 9 is a configurational view of an electromagnetic focus circuit according to the fourth preferred embodiment. Furthermore, parts which have the same functions as those of each part of the electromagnetic focus circuit shown in FIG. 3 are given the same reference numbers.

The switch controlling portion 26 controls the ON/OFF-timings of the respective switches 22, 23, and 24 constituting a switching circuit in compliance with the timings established by the data setting portion 27. The data setting portion 27 measures the cycle of horizontal synchronization signals, and correct the timing of switch changeover in the period during which electric current is regenerated from the focus circuit 14 to the voltage-variable power source 21 adaptive to the cycle.

Hereinafter, a description is given of the details of correction of the switch changeover timings by the data setting portion 27 with reference to FIG. 10.

Figure 10:
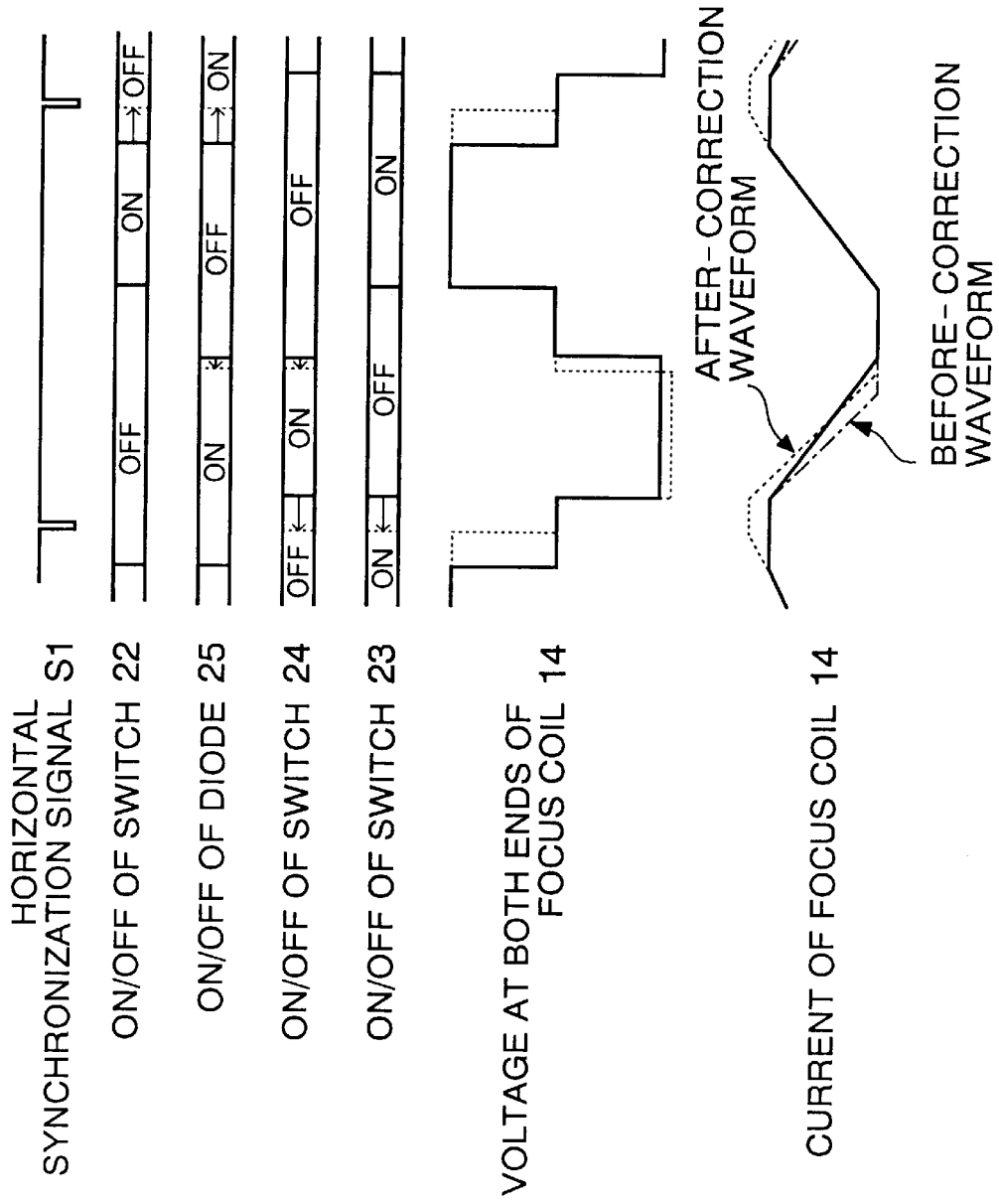
FIG. 10 is a view showing waveform at each part of the electromagnetic focus circuit in the fourth preferred embodiment.

The switch controlling portion 26 controls the ON/OFF-timings of the switches 22, 23 and 24, as shown in FIG. 10, in compliance with the timings established by the data setting portion 27 on the basis of the horizontal synchronization signals. The voltage-variable power source 21 and focus coil 14 are connected to each other at the timing when the switches 22 and 24 are simultaneously turned on, and the current of the focus coil 14 is linearly increased in proportion to time.

Next, the diode 25 is turned on by a counter electromotive force of the focus coil 14 at the moment when the switch 22 is turned off, thereby causing the focus coil 14 to be short-circuited by the diode 25 and switch 23 whereby a constant current is caused to continuously flow into the focus coil 14.

Next, as the switch 23 is turned off and the switch 24 is turned on, the focus coil 14 is connected to the voltage-variable power source 21 by the diode 25 and switch 24, and the current value is decreased in inverse proportion to time. The counter electromotive force of the focus coil becomes zero at the moment when no current flows into the focus coil 14, thereby causing the diode 25 to be turned off.

Herein, the current waveform shown with solid lines as a current of the focus coil 14 in FIG. 10 is the ideal waveform when it is assumed that the switch has no loss. In an actual circuit, the current which is regenerated from the focus coil 14 to the voltage-variable power source 21 is further decreased, due to a loss of the switches, than the ideal waveform, like the before-correction waveform shown with an alternate long and short dash line.

Therefore, the data setting portion 27 measures the cycle of horizontal synchronization signals S1 and corrects the changeover timing of the switches 22, 23, and 24 to the position shown with a broken line in FIG. 10 during the period where the current waveform is deviated from the ideal waveform. Thereby, the current waveform of the focus coil 14 becomes like the after-correction waveform shown with a broken line, and becomes close to the ideal waveform shown with a solid line, in comparison with the before-correction waveform.

Thus, by measuring the cycle of horizontal synchronization signals and correcting the timing of switch changeover in compliance with the measure value of the cycle, it is possible to achieve a highly accurate focus performance in various horizontal synchronization frequencies.

Furthermore, since horizontal synchronization signals are inputted into the data setting portion 27 and the ON/OFF-cycles of switch changeover are adjusted to be adaptive to the cycle, a highly accurate focus performance can be achieved at various horizontal synchronization frequencies. Furthermore, since the current is rapidly decreased in the period of regenerating from the focus coil to the power source, the error of the focus current can be lessened.

(Embodiment 5)

Figure 11:
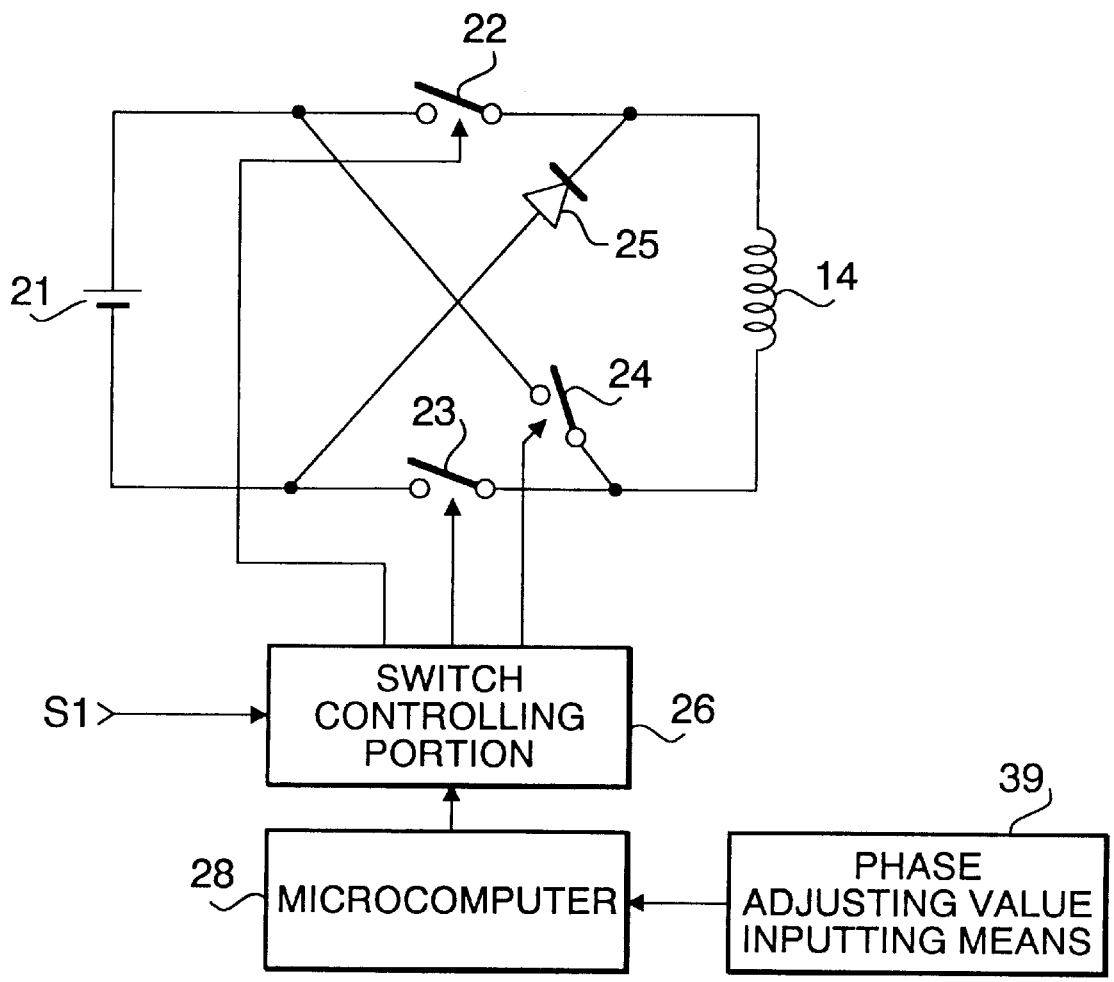
FIG. 11 is a configurational view of an electromagnetic focus circuit according to a fifth preferred embodiment.

FIG. 11 is a configurational view of an electromagnetic focus circuit in the fifth preferred embodiment.

A phase adjusting value inputting means 39 is connected to a microcomputer 28 which establishes the timings of the switch controlling portion 26. And a phase adjusting value to adjust the ON/OFF-timings of the switches is inputted into the microcomputer 28. The microcomputer 38 establishes a phase displacement amount which causes the ON/OFF-timings of the respective switches to slip from the position of the reference pattern shown with solid lines in FIG. 11 to the position shown with broken lines therein, in compliance with the phase adjusting value.

Hereinafter, a description is given of the detail of correction of switch changeover timings by the microcomputer 28, with reference to FIG. 10.

Using the phase adjusting value inputting means 39, a phase adjusting value is inputted into the microcomputer 28, and the ON/OFF-timings of the respective switches shown with broken lines in FIG. 10 are established in the switch controlling portion 26. Therefore, as shown with broken lines in FIG. 10, the ON/OFF-timings of the respective switches are corrected, thereby causing the focus current to be corrected like the after-correction waveform shown with broken lines in the current waveform of the focus current in FIG. 10, wherein the error from the ideal waveform of the focus current is lessened. In the three lines described in FIG. 10 as the electric current waveform of focus coil, a continuous line shows an ideal waveform, an alternative long and short dash line shows a before-correction waveform which is slipped out from the ideal waveform due to a loss of switch, and a short dashes line shows an after-correction waveform.

Thus, an inputting means which is able to adjust the timing from outside is attached to an operation means by which the ON/OFF timing of the switches is established. The changeover timing is adjusted on the basis of the timing adjustment data given by the inputting means. Therefore, the current in the period of regenerating from the focus coil to the power source will be rapidly decreased and the error of the focus current can be lessened.

(Embodiment 6)

Figure 12:
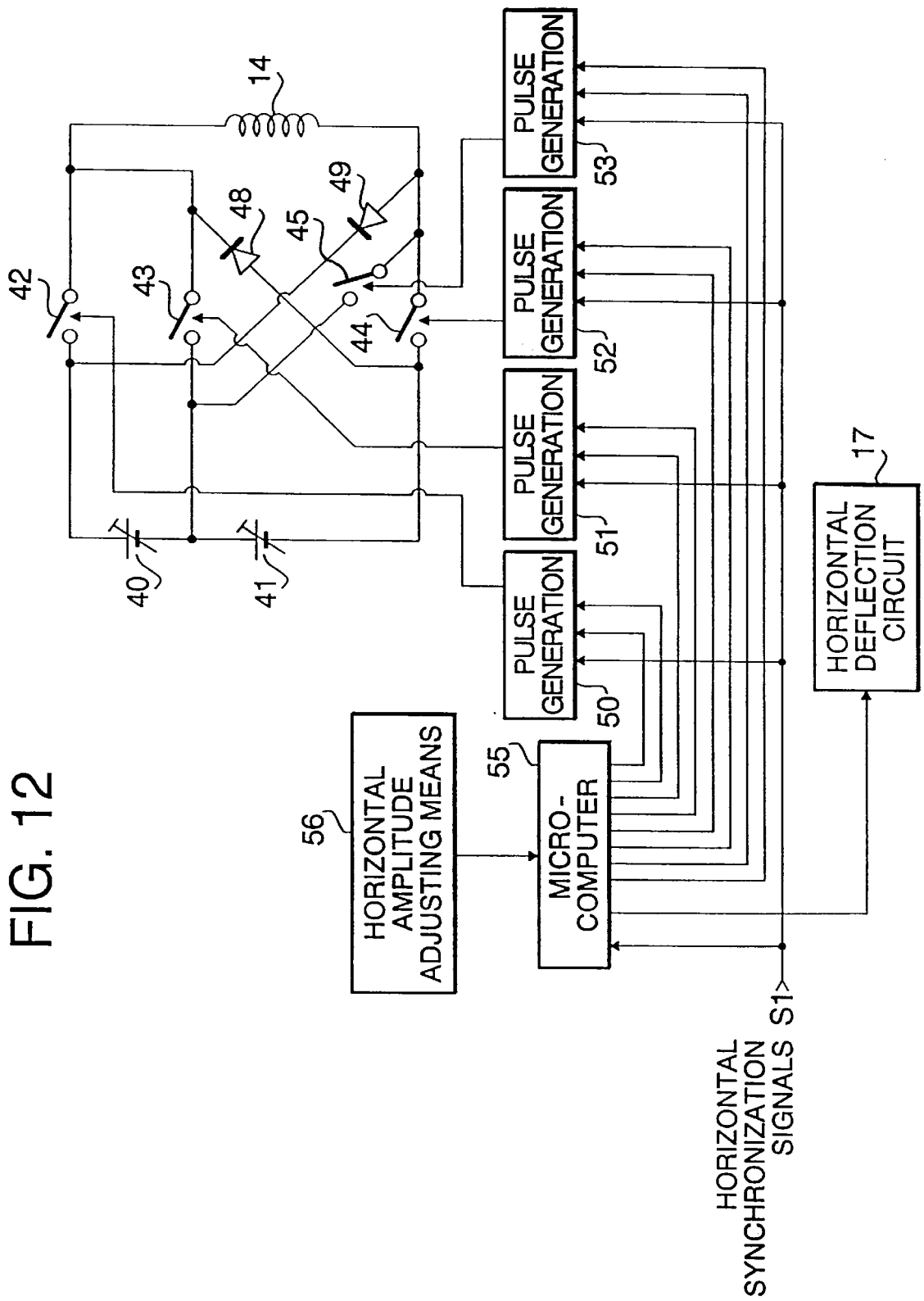
FIG. 12 is a configurational view of an electromagnetic focus circuit according to a sixth preferred embodiment.

FIG. 12 is a configurational view of an electromagnetic focus circuit in the sixth preferred embodiment.

The electromagnetic focus circuit shown in FIG. 12 is provided with the first voltage-variable power source 40, the second voltage-variable power source 41 connected in series to the cathode side of the first voltage-variable power source 40. The electromagnetic focus circuit forms a current waveform on the basis of the current supplied from the first and second voltage-variable power sources 40,41. The focus coil 14 adjusts the focus of electron beams on the basis of this current waveform.

The current waveform can be formed by ON/OFF-controlling of the four switches 42 to 45. The switch 42 connects the anode of the first voltage-variable power source 40 and one end of the focus coil 14 together. The switch 43 connects the anode of the second voltage-variable power source 41 and one end of the focus coil 14 together. The switch 44 connects the cathode of the second voltage-variable power source 41 and the other end of the focus coil 14 together. The switch 45 connects the other end of the focus coil 14 and the anode of the second voltage-variable power source 41. Therefore, as the switches 22, 24 are simultaneously turned on, electric current is supplied from the first and second voltage-variable power sources 40,41 to the focus coil 14. As the switches 23,24 are simultaneously turned on, electric current is supplied from the second voltage-variable power source 41 to the focus coil 14.

Furthermore, the actions of the diodes 48,49 contributes to formation of the current waveform. The anode terminal of the diode 48 is connected between the switch 44 and the cathode of the second voltage-variable power source 41, and the cathode terminal thereof is connected to one end of the focus coil 14. The anode terminal of the diode 49 is connected to the other end of the focus coil 14. The cathode terminal of the diode 49 is connected to the anode of the first voltage-variable power source 40. The cathode terminal of the diode 49 is connected to the anode of the first voltage-variable power source 40. Therefore, if the switch 44 is turned on while the switch 45 is turned off, the focus coil 14 is short-circuited through actions of the diode 48. If the switch 44 is turned off while the switch 45 is turned on, the second voltage-variable power source 41 is inversely connected to the focus coil 14 through actions of the diode 48. If both the switches 44 and 45 are turned off, the first and second voltage-variable power sources 40,41 are inversely connected to the focus coil 14 through the diodes 48,49. The ON/OFF-timings of the switches 42 to 45 are controlled by pulses supplied from pulse generation circuits 50 to 53 secured corresponding to the respective switches 42 to 45. The timing of supplying pulses, that is, the ON/OFF-timings of the switches 42 to 45 is determined by a microcomputer 55.

The microcomputer 55 outputs the reference values which determines the reference timing of the ON/OFF-control in compliance with the quantity of switches. The reference value is regulated by the time which elapses from the commencement of one cycle of horizontal synchronization signals. The reference timing is determined on the basis of the ideal current waveform which establishes the ideal focal position of electron beam in synchronization with the horizontal synchronization signal. In the pulse generation circuits 50 to 53 which receive the reference value, pulses are outputted, corresponding to the reference timing regulated by the reference value.

The microcomputer 55 is able to function as a timing adjusting means which outputs a correction value by which the reference value is corrected in compliance with the horizontal amplitude value supplied from a horizontal amplitude adjusting circuit 56. As the microcomputer 55 outputs the correction value along with the reference value, the pulse generation circuits 50 to 53 which has received the reference value and correction value output pulses at a timing deviated from the reference timing. Furthermore, a horizontal synchronization signal which synchronizes these operations is supplied to the microcomputer 55 and pulse generation circuits 50 to 53.

Figure 13:
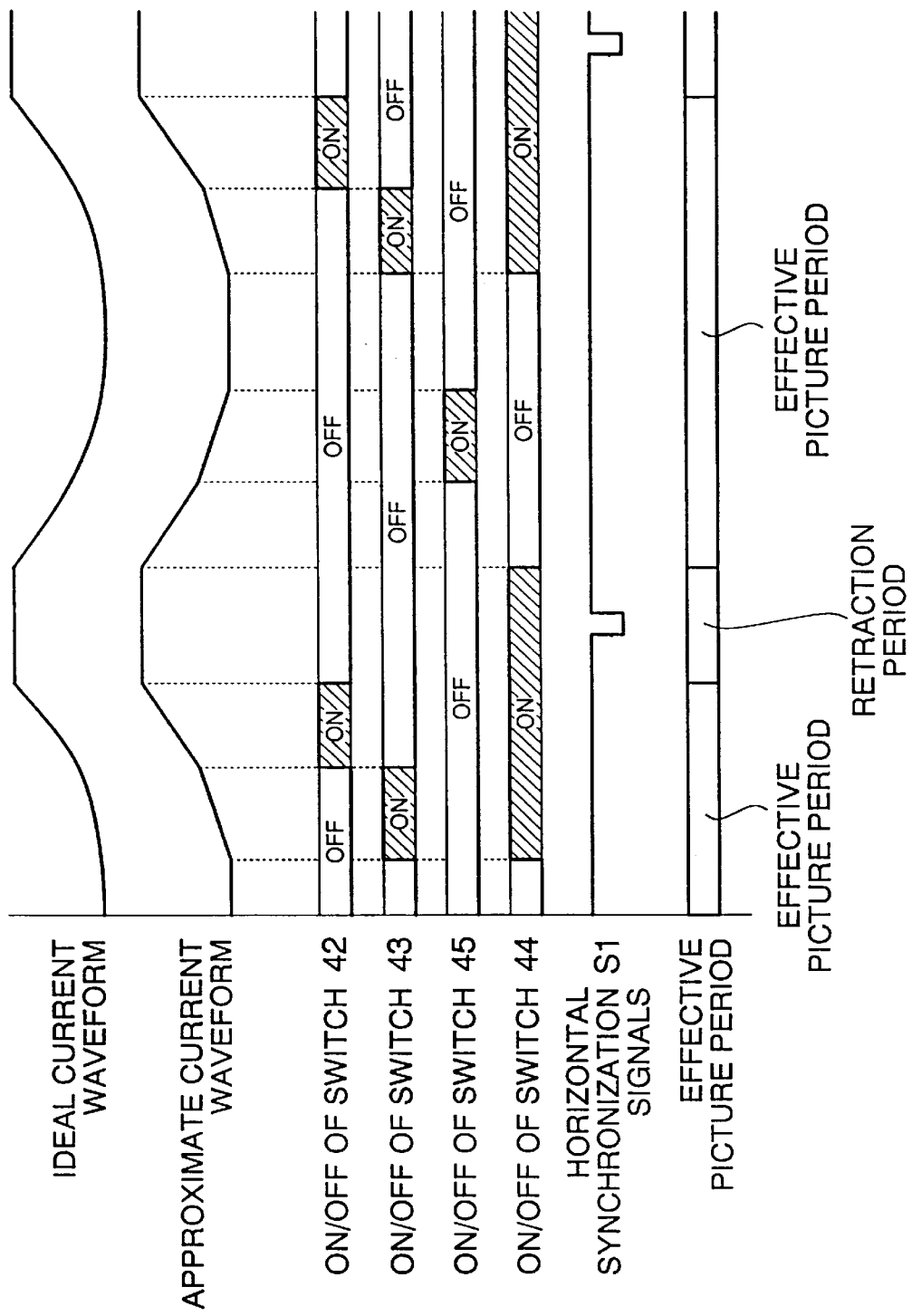
FIG. 13 is a view showing electric current waveform in line ON/OFF-controlling of switches in the sixth preferred embodiment.

A description is given of the actions of the electromagnetic focus circuit constructed as described, using FIG. 13.

FIG. 13 shows a case of forming electric current waveform in compliance with general effective picture period. When scanning in the horizontal direction by electron beams, the ideal current waveform is regulated by the shape of the fluorescent surface of a cathode-ray tube. On the basis of the ideal current waveform, the microcomputer 55 outputs the reference value into the pulse generation circuits 50 to 53. At the moment when the switches 43, 44 are simultaneously turned on, the second voltage-variable power source 41 is connected to the focus coil 14, whereby the current supplied to the focus coil 14 is linearly increased at an inclination regulated by the output voltage of the second voltage-variable power source 41. If the switch 42 is turned on instead of the switch 43, at the moment the first and second voltage-variable power sources 40,41 are connected in series to the focus coil 14. The current flowing into the focus coil 14 is gradually increased linearly at an inclination regulated by the output voltage made up by the first and second voltage-variable power sources 40,41.

Subsequently, if the switch 42 is turned on, at the moment the diode 48 is turned on by a counter electromotive force generated in the focus coil 14. The focus coil 14 is short-circuited by the diode 48 and switch 44, whereby a constant current is caused to continuously flow into the focus coil 14. While the current is kept constant, the electron beam is retraced and is brought back to the scanning commencement position of the fluorescent surface.

As soon as the next effective picture period commences, the switch 44 is turned off. The diode 49 is turned on by a counter electromotive force generated at this time. As a result, the first and second voltage-variable power sources 40, 41 are inversely connected to the focus coil 14 by actions of the diodes 28,29. The current flowing into the focus coil 14 is linearly decreased in line with a linear increase of the current coming from the first and second voltage-variable power sources 40,41. Subsequently, as the switch 45 is turned on, the second voltage-variable power source 41 is inversely connected to the focus coil 14 by the switch 45 and diode 48. Therefore, the current flowing into the focus coil 14 is linearly decreased in line with a linear increase of the current coming from the second voltage-variable power source 41. As no current is permitted to flow into the focus coil 14, the counter electromotive force becomes zero to cause the diode 48 to be turned off. At this moment, the switch 45 is turned off.

Thus, even in a case where the effective picture period in the horizontal direction changes, the ON/OFF-timing of a plurality of switches can be adjusted in compliance with the horizontal amplitude value. Therefore, the current waveform of electric current flowing into the focus coil 14 can be made approximate to the ideal current waveform. By repeating a series of operations in synchronization with the horizontal synchronization signal, the focus of the electron beam on the fluorescent surface 13 can be continuously secured.

Figure 14:
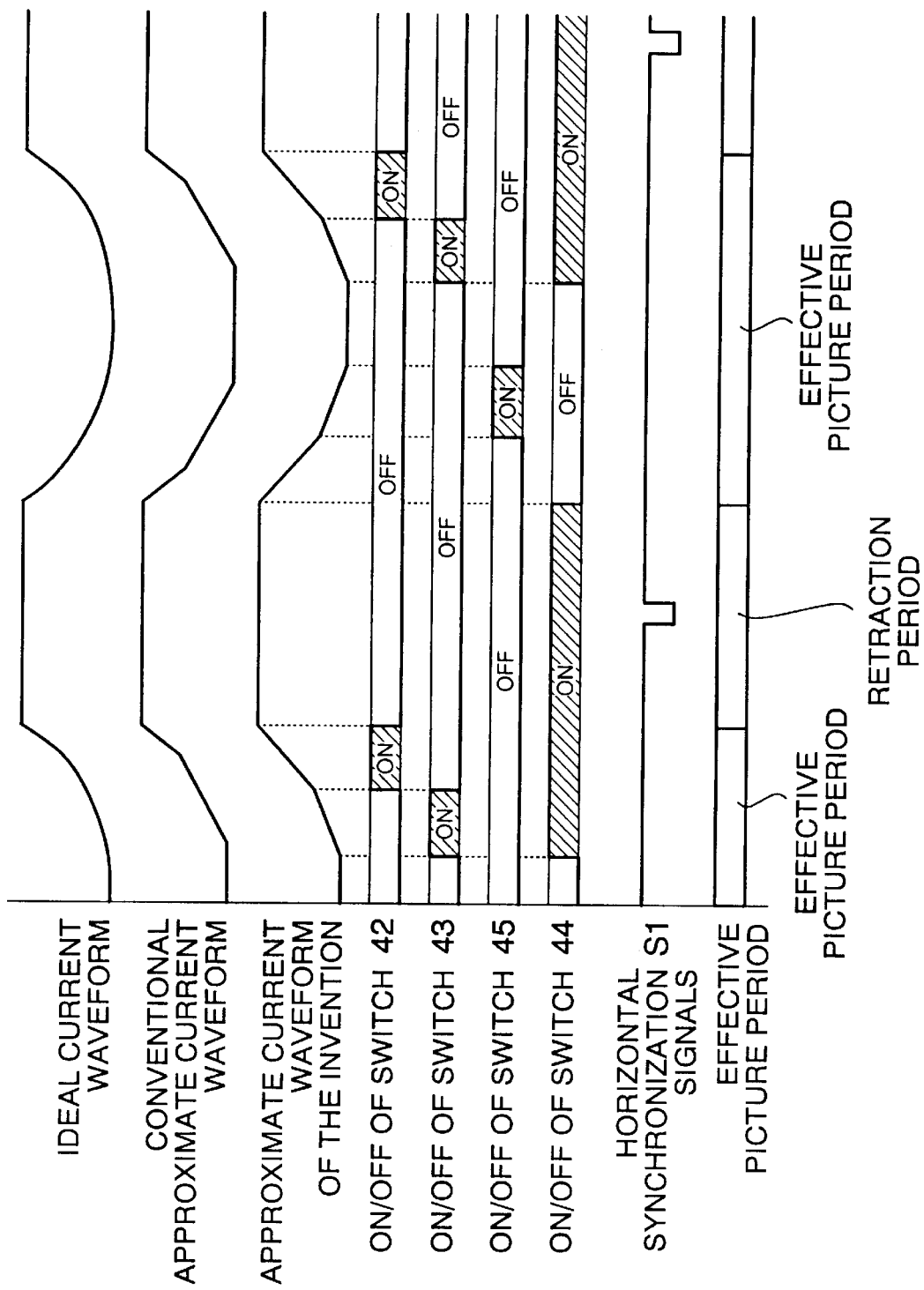
FIG. 14 is a view showing electric current waveform when changing the effective picture term in the sixth preferred embodiment.

Next, as shown in FIG. 14, a case where the effective picture period is shortened is now taken into consideration. In this case, the horizontal amplitude adjusting circuit 56 establishes the horizontal amplitude value of electron beam adaptive to the shortened effective picture period. The ideal current waveform changes in line with shortening of the effective picture period. The microcomputer 55 sets a correction value on the basis of this changed ideal current waveform. The correction value is supplied to the pulse generation circuits 50 to 53 together with the reference value. The ON/OFF-timing is caused to slip from the reference timing by this correction value. As a result, it is possible that the current waveform outputted from the electromagnetic focus circuit is made approximate to the ideal current waveform.

Thus, even when adjusting the horizontal amplitude value of electron beam, the ON/OFF-timing of the switching circuit is deviated from the reference timing in compliance with the horizontal amplitude value, whereby it is possible to better maintain the approximation accuracy of the electric current waveform of the focus coil with respect to the ideal current waveform.

(Embodiment 7)

Figure 15:
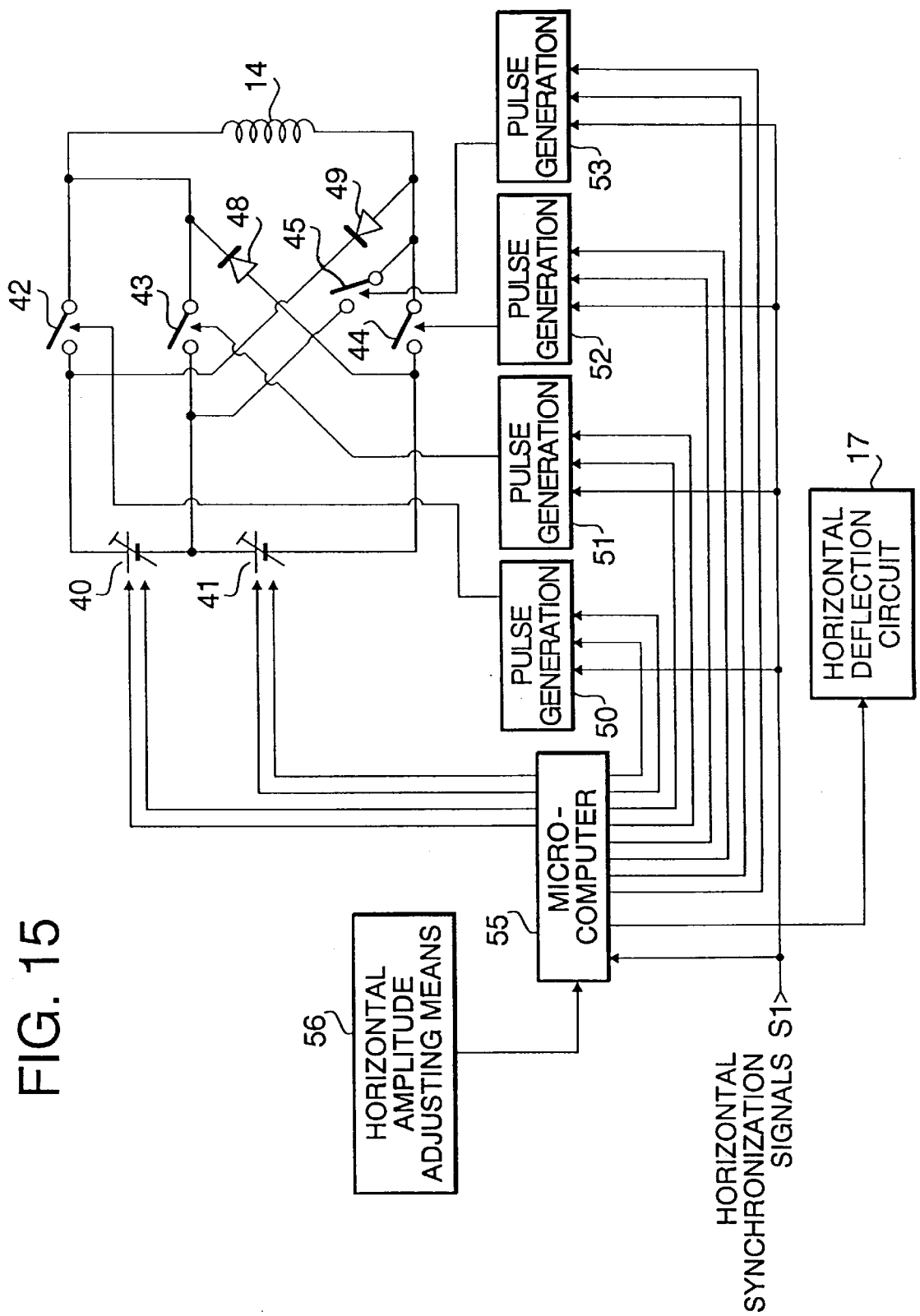
FIG. 15 is a configurational view of an electromagnetic focus circuit according to a seventh preferred embodiment.

FIG. 15 is a configurational view of an electromagnetic focus circuit according to the seventh preferred embodiment. In the seventh preferred embodiment, instead of a timing adjusting means of the sixth preferred embodiment, a power source voltage adjusting means is provided, which is able to adjust the output voltage of the first and second voltage-variable power source on the basis of the horizontal amplitude value, of electron beam, established by the horizontal amplitude adjusting circuit. The amplitude of the electric current waveform supplied to the focus coil 14 is adjusted by adjusting the output voltage. Furthermore, components which display the same functions as those of the components in the sixth preferred embodiment are given the same reference numbers, and the detailed description thereof is omitted herein.

In the seventh preferred embodiment, the output voltage of the first and second voltage-variable power sources 40,41 is adjusted by the microcomputer 55 which acts as a power source voltage adjusting means. The microcomputer 55 generates a reference value which determines the reference voltage of the first and second voltage-variable power sources 40,41 in compliance with the quantity of switches, and a correction value which corrects the reference value on the basis of the horizontal amplitude value supplied from the horizontal amplitude adjusting circuit 56. By this correction value, the reference voltage of the first and second voltage-variable power source 40,41 is corrected.

Thus, even in a case where the effective picture period in the horizontal direction changes, the output voltage of the power source is adjusted in compliance with the horizontal amplitude value, thereby causing the amplitude of the current waveform of electric current flowing into the focus coil 14 to be approximated to the ideal current waveform.

Figure 16:
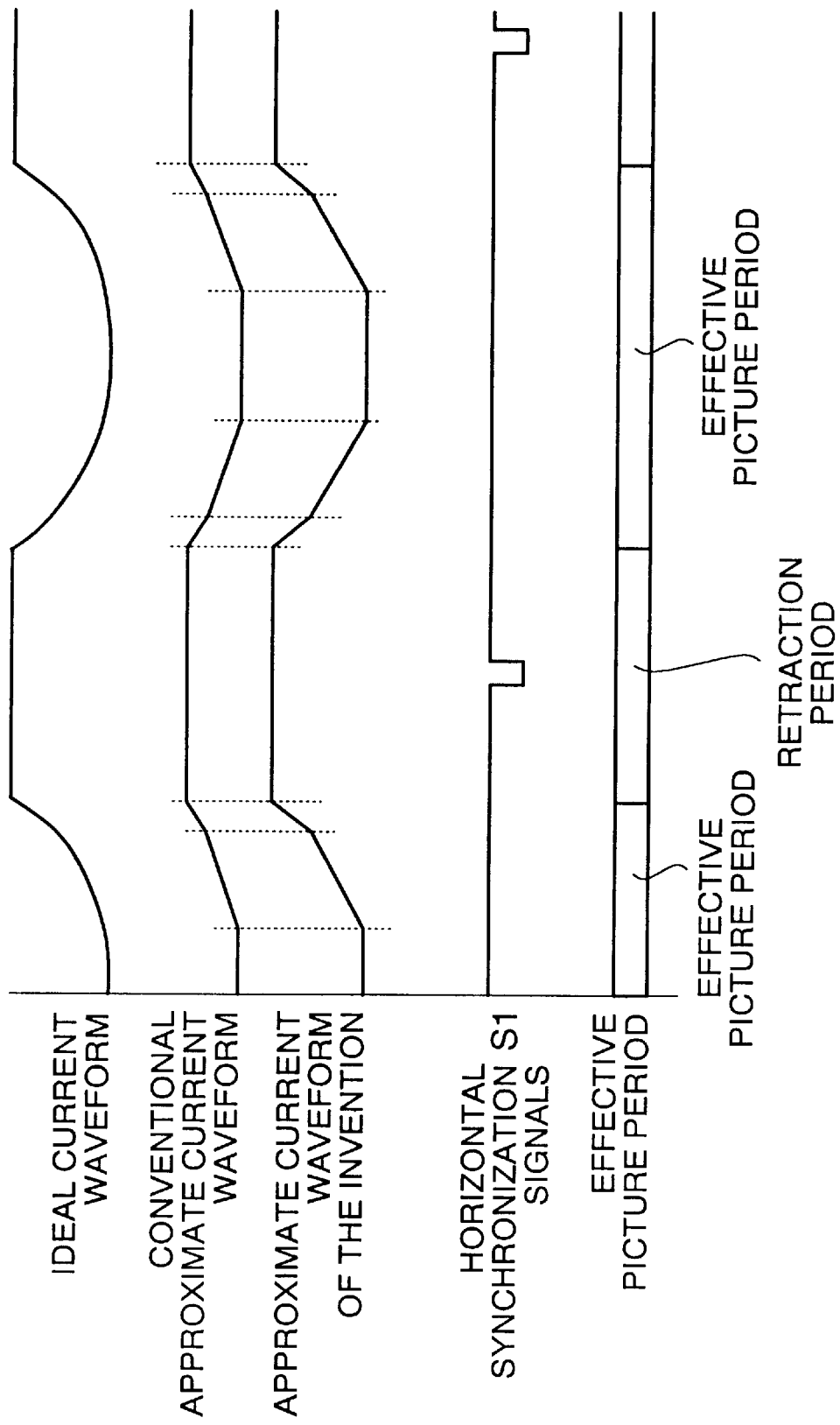
FIG. 16 is a view showing electric current waveform when changing the effective picture term in the seventh preferred embodiment.

Next, as shown in FIG. 16, a case where the effective picture period is shortened is taken into consideration. In this case, the horizontal amplitude adjusting circuit 56 establishes the amplitude value of electron beam adaptive to the shortened effective picture period. The ideal current waveform changes in line with shortening of the effective picture period. At this time, the microcomputer 55 sets a correction value on the basis of the changed ideal current waveform. The correction value is supplied to the first and second voltage-variable power sources 40,41 together with the reference value. The output voltage of the first and second voltage-variable power sources 40,41 may change by the correction value. Resultantly, even in a case of the ON/OFF-timing being similar to the previous one, by changing the ratio of an increase or decrease of the electric current flowing into the focus coil 14, that is, the inclination of the increase or the inclination of the decrease, the current waveform outputted from the electromagnetic focus circuit 40 can be approximated to the ideal current waveform.

Thus, even when adjusting the horizontal amplitude value of electron beam, the output voltage of the power source is deviated from the reference voltage in compliance with the horizontal amplitude value, whereby it is possible to better maintain the approximation accuracy of the electric current waveform of the focus coil with respect to the ideal current waveform.

(Embodiment 8)

Figure 17:
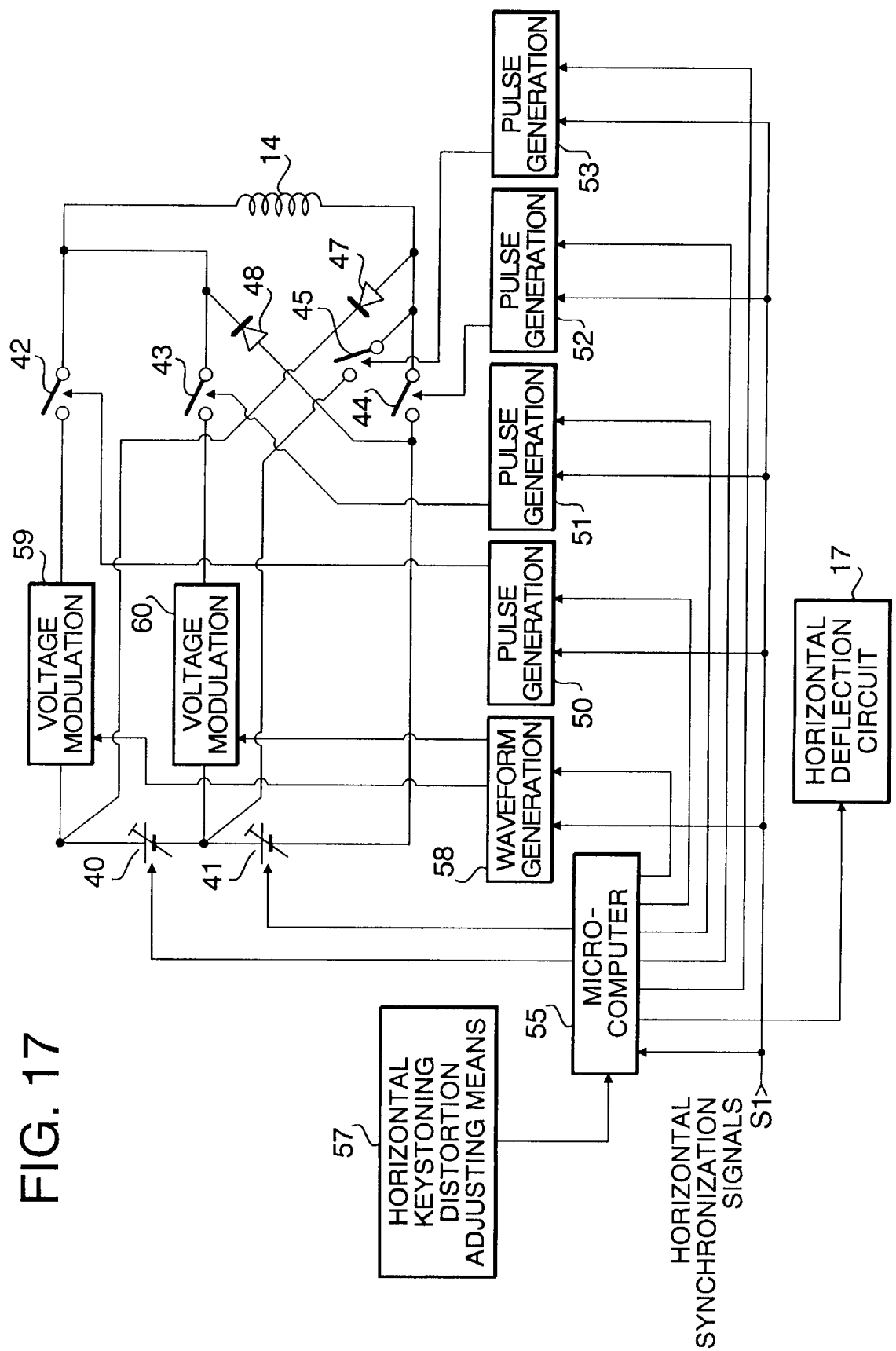
FIG. 17 is a configurational view of an electromagnetic focus circuit according to an eighth preferred embodiment.

FIG. 17 is a configurational view of an electromagnetic focus circuit according to the eighth preferred embodiment. The eighth preferred embodiment is provided with a waveform generation circuit 58 which, on the basis of a horizontal keystoning distortion value established by a horizontal keystoning distortion adjusting circuit 57, generates the ideal current waveform at which the ideal focal position of electron beam can be established, and voltage modulating circuits 59,60 which, on the basis of the ideal current waveform, modulate the output voltage of the first and second voltage-variable power sources 40,41. The amplitude of the current waveform coming from the electromagnetic focus circuit can be adjusted through modulation of the output voltage.

Furthermore, components which display the same functions as those of the components of the sixth preferred embodiments are given the same reference numbers, and the detailed description thereof is omitted.

Figure 18A:
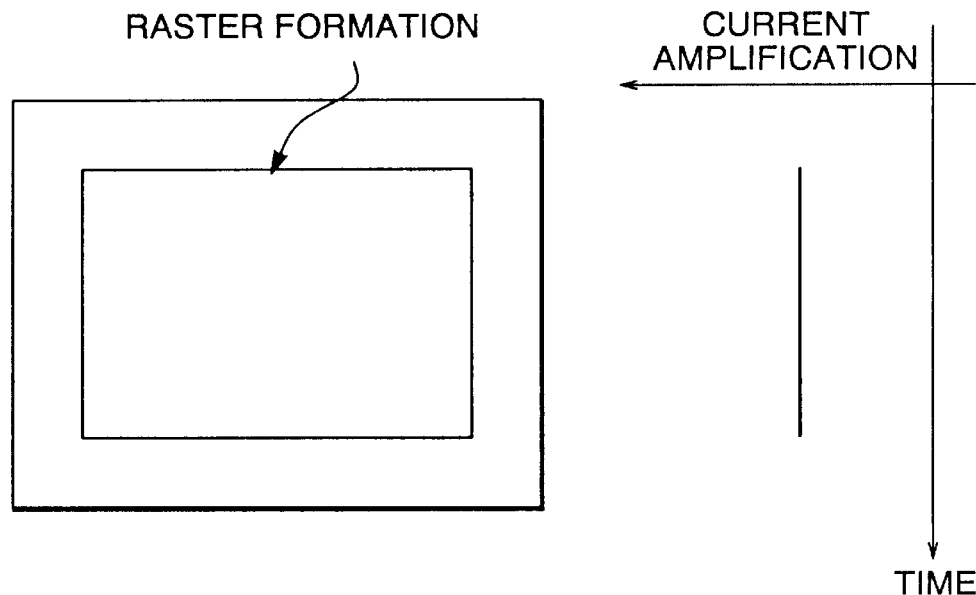
FIGS. 18A and 18B are views showing the relationship between the raster shape changes and the electric current amplitude on the basis of plane keystoning distortion in the eight preferred embodiment.
Figure 18B:
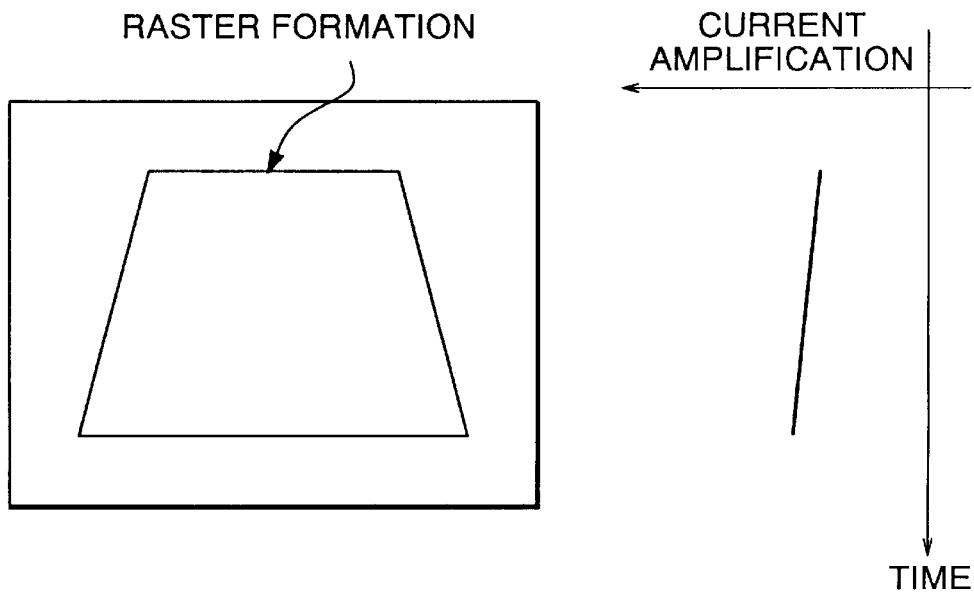

As shown in FIG. 18, in a case where raster is formed by right angle projection, the current amplitude of the ideal current waveform can be kept constant even though the horizontal scanning of the electron beam proceeds downward. On the other hand, in a case where raster is formed by diagonal projection, the current amplitude of the ideal current waveform is linearly increased in line with downward advancement of the horizontal scanning of the electron beam. The microcomputer 55 outputs the ideal current waveform in compliance with changes from the waveform generation circuit 58 upon detecting the changes of the horizontal keystoning distortion value established by the horizontal keystoning distortion adjusting circuit 57. The output voltage coming from the first and second voltage-variable power sources 40,41 is modulated by the voltage modulation circuits 53,54 on the basis of the waveform generation circuit 58. As a result, it is possible to make the current waveform, which is outputted from the electromagnetic focus circuit, approximate to the ideal current waveform at the upper and lower parts of a picture screen.

Thus, even in a case where the horizontal keystoning distortion is changed in line with a change of the raster pattern, the current waveform can be approximated to the ideal current waveform in compliance with the changes of the horizontal keystoning distortion, and it is possible to keep the approximation accuracy constant at the upper and lower parts of picture screens with respect to the ideal current waveform.

Furthermore, the present invention is not limited to the abovementioned preferred embodiments. An electromagnetic focus circuit may be assembled by various combinations of the respective preferred embodiments. Furthermore, the circuit elements of the electromagnetic focus circuit may be substituted by other elements having the same functions.

What is claimed is:

1. An electromagnetic focus apparatus comprising:
   a focus coil;
   a power source for supplying power to said focus coil;
   a switching circuit having a plurality of switches for supplying power from said power source to said focus coil on the basis of various combinations of ON/OFF-timings of the plurality of switches, and for regenerating electric current from said focus coil to said power source;

data setting means for setting a timing at which plurality of switches of said switching circuit are controlled;

switch controlling means for controlling said plurality of switches in synchronization with horizontal synchronization signals on the basis of the timing set by the data setting means;

a current detecting resistor, the current detecting resistor intervening between said focus coil and said power source, the current detecting resistor detecting the current flowing into the focus coil; and current interrupting means, the current interrupting means comparing a current value detected by said current detecting resistor with a reference value, the current interrupting means forcibly turning off a line switch, which supplies the current to said focus coil, when said detection current value exceeds said reference value, wherein an electric current linearly increasing in proportion to time flows to said focus coil in a case of applying a constant voltage to said focus coil.

2. The electromagnetic focus apparatus according to claim 1, comprising a reference value optimizing means which generates reference values adapted to a cycle measurement value by measuring the cycle of the horizontal synchronization signals and establishing the reference value adaptive to the cycle of the horizontal synchronization signals for the current interrupting means.

3. The electromagnetic focus apparatus according to claim 2, the reference value optimizing means including a D/A converter which outputs a direct current voltage responsive to an input data and establishes said direct current voltage in the current interrupting means as a reference voltage, and a calculation means which calculates a cycle measurement value by measuring the cycle of the horizontal synchronization signals and outputs an instruction data of the reference voltage responsive to the cycle measurement value to said D/A converter.

4. An electromagnetic focus apparatus comprising:

a focus coil;

a power source for supplying power to said focus coil;

a switching circuit having a plurality of switches, said switching circuit supplying power from said power source to said focus coil on the basis of ON/OFF combinations of the plurality of switches, the switching circuit regenerating electric current from said focus coil to said power source;

data setting means for setting a timing at which the plurality of switches of said switching circuit are controlled;

switch controlling means for changing over the plurality of switches in synchronization with horizontal synchronization signals on the basis of the timing established by the data setting means; and a short-circuit preventing switch which is secured in a line for inputting an ON/OFF control signal coming from said switch controlling means into one of two switches, in which said power source is short-circuited in said one of two switches if both of said two switches are simultaneously turned on, said short-circuit preventing switch being controlled in an inverse logic of the ON/OFF-controlling of the other switch of said two switches.

5. An electromagnetic focus apparatus comprising:

a focus coil;

a power source for supplying power to said focus coil;

a switching circuit consisting of a plurality of switches, said switching circuit supplying power from said power source to said focus coil on the basis of ON/OFF-combinations of the plurality of switches, said switching circuit regenerating electric current from said focus coil to said power source;

phase adjusting value inputting means for adjusting the timings of ON/OFF-controlling of the respective plurality of switches included in said switching circuit;

calculation means for establishing the timings of ON/OFF-controlling of the respective plurality of switches of said switching circuit according to a phase adjusting value inputted from said phase adjusting value inputting means; and switch controlling means for changing over the plurality of switches on the basis of the timing established by said calculation means.

6. An electromagnetic focus apparatus comprising:

a focus coil for adjusting the focal point of electron beam;

a power source for supplying electric current flowing into said focus coil;

a switching circuit comprising a plurality of switches, the switching circuit generating a current waveform of said focus coil from ON/OFF-combinations of the plurality of switches;

power source voltage adjusting means for adjusting the power source voltage in synchronization with horizontal synchronization signals on the basis of a current value; and switch controlling means for changing over the switches on the basis of the power source voltage adjusted by said power source voltage adjusting means.

7. The electromagnetic focus apparatus according to claim 6, said power source voltage adjusting means generating a reference value, the reference value determining a reference voltage of the power source in compliance with the plurality of switches constituting the switching circuit, the reference value determining a correction value which corrects the reference value in compliance with a current value, and changes to cause an output voltage to deviate from the reference voltage according to the correction value.

8. The electromagnetic focus apparatus as set forth in claim 6, wherein said power source voltage adjusting means adjust said output voltage on the basis of the ideal current waveform by which the ideal focal position of the electron beam is established in synchronization with the horizontal synchronization signals.

9. An electromagnetic focus apparatus comprising:

a focus coil;

a power source for supplying power to said focus coil;

a switching circuit having a plurality of switches, the switching circuit supplying power from said power source to said focus coil on the basis of various combinations of ON/OFF-timings of the plurality of switches, the switching circuit regenerating electric current from said focus coil to said power source;

data setting means for setting a timing at which the plurality of switches of said switching circuit are controlled;

switch controlling means for controlling said plurality of switches in synchronization with horizontal synchronization signals on the basis of the timing established by the data setting means;

a current detecting resistor, the current detecting resistor between said focus coil and said power source, the current detecting resistor detecting the current flowing into the focus coil;

current interrupting means, the current interrupting means comparing the value detected by said current detecting resistor with a reference value, the current interrupting means forcibly turning off a switch in the line, which supplies a current to said focus coil, in a case where said detection value exceeds said reference value; and a reference value optimizing means which generates reference values adapted to a cycle measurement value by measuring the cycle of the horizontal synchronization signals, the reference value optimizing means establishing the reference value adaptive to the cycle of the horizontal synchronization signals for the current interrupting means, wherein the reference value optimizing means includes a D/A converter which outputs a direct current voltage responsive to an input data and establishes said direct current voltage in the current interrupting means as the reference voltage, and wherein the reference value optimizing means includes a calculation means which measures the cycle of the horizontal synchronization signals and outputs an instruction data of the reference voltage responsive to the cycle measurement value to said D/A converter.

10. An electromagnetic focus apparatus comprising:

a focus coil;

a power source for supplying power to said focus coil;

a switching circuit having a plurality of switches, the switching circuit supplying power from said power source to said focus coil on the basis of ON/OFF-combinations of the plurality of switches, the switching circuit regenerating electric current from said focus coil to said power source;

data setting means for measuring the cycle of horizontal synchronization signals and for establishing timings of ON/OFF-controlling of said plurality of switches in compliance with a cycle measurement value; and switch controlling means for changing over the plurality of switches on the basis of the timings established by said calculation means, wherein said data setting means corrects the timing of ON/OFF-controlling of said plurality of switches so as to make a current waveform of the focus coil proximate to an ideal current waveform.

11. An electromagnetic focus apparatus comprising:

a focus coil for adjusting the focus of electron beam;

a switching circuit having switches, the switching circuit generating a current waveform of said focus coil from ON/OFF-combinations of the switches;

timing adjusting means for adjusting timings of ON/OFF-controlling of respective said switches included in said switching circuit in synchronization with horizontal synchronization signals on the basis of a current value; and switch controlling means for changing over the switches on the basis of the timing adjusted by said timing adjusting means, wherein said timing adjusting means adjusts the timings of ON/OFF-controlling on the basis of an ideal current waveform by which a focal position of the electron beam is established in synchronization with the horizontal synchronization signals, the timing adjusting means generates a reference value which determines a reference timing of the ON/OFF-controlling in compliance with the number of switches in the switching circuit, and a correction value for correcting the reference value in compliance with said current value, and further changes to cause the timing of the ON/OFF-controlling to deviate from the reference timing.

* * * * *

UNITED STATES PATENT AND TRADEMARK OFFICE
CERTIFICATE OF CORRECTION

PATENT NO.   : 6,011,365
DATED        : January 4, 2000
INVENTOR(S)  : T. GYOTEN It is certified that error appears in the above-identified patent and that said Letters Patent is hereby corrected as shown below:

On the cover of the printed patent, at Item [56], References Cited, the following OTHER PUBLICATION was omitted and should be included:

An English Language Abstract of JP 8-256277.

Signed and Sealed this

Twenty-seventh Day of March, 2001

*Attest:*

NICHOLAS P. GODICI

*Attesting Officer*   *Acting Director of the United States Patent and Trademark Office*